United States Patent
Agahi et al.

(10) Patent No.: US 11,153,198 B2
(45) Date of Patent: Oct. 19, 2021

(54) HYBRID COMMUNICATION BETWEEN BATTERY SENSOR NODES OF A BATTERY MANAGEMENT SYSTEM

(71) Applicant: SENSATA TECHNOLOGIES, INC., Attleboro, MA (US)

(72) Inventors: Arjang Agahi, Templepatrick (IE); Philip S. Craig, Ballymena (IE); Jing Deng, Belfast (IE); Peter J. Tasker, Staverton (GB); Stephen Millen, Coleraine (IE)

(73) Assignee: Sensata Technologies, Inc., Attleboro, MA (US)

(*) Notice: Subject to any disclaimer, the term of this patent is extended or adjusted under 35 U.S.C. 154(b) by 11 days.

(21) Appl. No.: 16/263,175

(22) Filed: Jan. 31, 2019

(65) Prior Publication Data

US 2020/0252328 A1   Aug. 6, 2020

(51) Int. Cl.
| | | |
|---|---|---|
| *H04W 4/00* | (2018.01) | |
| *H04L 12/707* | (2013.01) | |
| *H04B 3/54* | (2006.01) | |
| *H04B 5/00* | (2006.01) | |
| *H04L 12/911* | (2013.01) | |
| *H04L 12/931* | (2013.01) | |

(52) U.S. Cl.
CPC ............ *H04L 45/24* (2013.01); *H04B 3/54* (2013.01); *H04B 5/0031* (2013.01); *H04L 47/728* (2013.01); *H04L 49/201* (2013.01)

(58) Field of Classification Search
CPC ............... H04L 45/28; H04L 41/0654; H04L 2012/5627; H04L 45/24; H04L 47/728; H04J 2203/006; H04B 3/54; H04B 5/0031
See application file for complete search history.

(56) References Cited

U.S. PATENT DOCUMENTS

| | | | |
|---|---|---|---|
| 6,243,413 B1 | 6/2001 | Beukema | |
| 6,728,323 B1* | 4/2004 | Chen | H03M 13/3738 |
| | | | 375/340 |
| 7,269,403 B1* | 9/2007 | Miao | H04B 3/542 |
| | | | 455/11.1 |
| 8,169,311 B1 | 5/2012 | Breed | |
| 9,267,993 B2 | 2/2016 | Farmer et al. | |
| 9,293,935 B2 | 3/2016 | Lee et al. | |
| 2006/0002368 A1 | 1/2006 | Budampati et al. | |
| 2007/0054622 A1 | 3/2007 | Berkman | |
| 2007/0185981 A1 | 8/2007 | Koga et al. | |
| 2007/0201540 A1 | 8/2007 | Berkman | |
| 2008/0101654 A1* | 5/2008 | Sano | G08B 21/0484 |
| | | | 382/103 |

(Continued)

FOREIGN PATENT DOCUMENTS

WO   2018064179 A1   4/2018

*Primary Examiner* — Siren Wei
(74) *Attorney, Agent, or Firm* — Mark H. Williams (57) ABSTRACT

According to one embodiment, a system for hybrid communication between electronic circuits is disclosed. The system includes a plurality of sensor nodes configured to read data from one or more sensors. The system also includes a master node configured to receive periodic data transmissions from each of the plurality of sensor nodes via a primary transmission medium and a secondary transmission medium, which is different from the primary transmission medium.

10 Claims, 9 Drawing Sheets

(56) References Cited

U.S. PATENT DOCUMENTS

| | | | |
|---|---|---|---|
| 2008/0258903 A1* | 10/2008 | Le | G08B 13/19602 |
| | | | 340/506 |
| 2011/0164555 A1* | 7/2011 | Yim | H04W 72/121 |
| | | | 370/328 |
| 2012/0052801 A1 | 3/2012 | Kulkarni | |
| 2014/0177692 A1 | 6/2014 | Yu | |
| 2015/0188334 A1 | 7/2015 | Dao et al. | |
| 2015/0288532 A1 | 10/2015 | Veyseh et al. | |
| 2016/0142891 A1* | 5/2016 | Virhia | G06Q 10/00 |
| | | | 340/870.07 |
| 2017/0005371 A1* | 1/2017 | Chidester | B60L 3/0046 |
| 2018/0077763 A1* | 3/2018 | Schneider | A61J 9/02 |
| 2018/0331956 A1* | 11/2018 | Cui | H04W 4/023 |
| 2019/0116632 A1* | 4/2019 | Virkkala | H04L 67/12 |

* cited by examiner

FIG. 9

HYBRID COMMUNICATION BETWEEN BATTERY SENSOR NODES OF A BATTERY MANAGEMENT SYSTEM

FIELD OF THE INVENTION

The present disclosure relates to hybrid communication between electronic circuits.

BACKGROUND OF THE INVENTION

Many systems rely on a central location to receive and process signals from a variety of various sources. For example, a control system in a vehicle may utilize data transmitted periodically from sensors attached to different vehicle parts. Wireless transmission of this data raises the possibility of interference due to other signals within the same frequency band. For example, data transmitted from sensors to a control system over the 2.4 GHz frequency band may be subject to interference from cell phones, car alarms, and other devices that also operate in the same frequency band.

SUMMARY OF THE INVENTION

According to one embodiment, a system for hybrid communication between electronic circuits is disclosed. The system includes a plurality of sensor nodes configured to read data from one or more sensors. The system also includes a master node configured to receive periodic data transmissions from each of the plurality of sensor nodes via a primary transmission medium and a secondary transmission medium, which is different from the primary transmission medium. In this embodiment, data transmitted on the secondary transmission medium may act as a backup communication in case there is interference with the primary transmission medium.

In another embodiment, a system for hybrid communication between electronic circuits includes a plurality of sensor nodes configured to read data from one or more sensors. The system also includes a deputy node coupled to each sensor node of the plurality of sensor nodes. The system further includes a master node configured to receive periodic data transmissions from each of the plurality of sensor nodes via a primary transmission medium and from each deputy node. In this embodiment, data from the deputy nodes may act as a backup communication in case there is interference with the primary transmission medium. In a particular embodiment, the deputy node may also help improve the performance of the master node. In both embodiments, utilizing a hybrid combination of multiple transmission mediums has the advantage of improving the reliability of communication between the sensor nodes and the master node.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

So that those having ordinary skill in the art to which the disclosed technology appertains will more readily understand how to make and use the same, reference may be had to the following drawings.

DETAILED DESCRIPTION

The present disclosure describes a system that can be used for wireless communication between a master node and sensor nodes.

Figure 1:
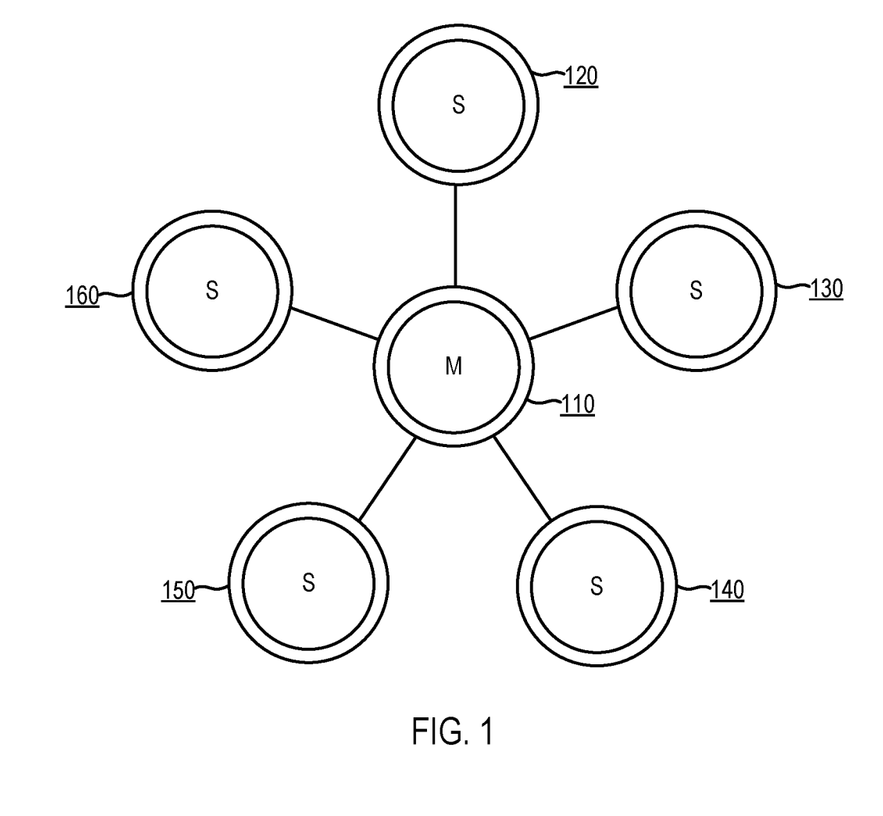
FIG. 1 shows an illustrative block diagram of a network topology that can be used to read data from sensors.

FIG. 1 shows an illustrative graph diagram of a system in which embodiments of the present disclosure can be used. System 100 includes a master node 110 and multiple sensor nodes 120, 130, 140, 150, and 160. It should be noted that, although nodes 120, 130, 140, 150, and 160 are referred to as sensor nodes, this disclosure is not limited to nodes that are coupled to sensors. This disclosure can be extended to any type of system in which multiple nodes are coupled to a single node. Any type of device that desires to couple to a master node can be used. In some embodiments, they could be termed slave nodes or secondary nodes. In addition, a master node may also be referred to as a central node. It should be understood that, while only five sensor nodes are shown in FIG. 1, some embodiments can many more sensor nodes coupled to the master node 110. It should also be understood that there may be systems that include multiple master nodes, each coupled to multiple sensor nodes. For sake of simplicity, only systems with a single master node are discussed.

Each of the sensor nodes 120, 130, 140, 150, and 160 is coupled to the master node 110. The master node may then be used to aggregate data from the sensor nodes 120, 130, 140, 150, and 160. In many vehicles, such a coupling utilizes wiring. However, as more electronics are placed in vehicles, there is a greater desire for additional sensors and other electronic devices to be placed in the vehicles. As such, there is a greater need for wiring, adding to clutter in the vehicles. It should be understood that, although certain examples described herein discuss the use of embodiments in vehicles, embodiments are not limited to vehicles and can be used in many different environments.

One solution is to use wireless communications technology to transmit information between each of sensor nodes 120, 130, 140, 150, and 160 with master node 110. Existing wireless communication technology has several drawbacks. For example, the 2.4 GHz band of wireless frequencies has characteristics that are favorable for such a use case. In some embodiments, a 2.4 GHz band that is within an industrial, scientific, and medical (ISM) band can be used. ISM bands might be chosen because they are reserved internationally for non-telecommunications purposes. However, there are many different technologies that use frequencies in and around the 2.4 GHz band. These technologies include microwave ovens, cordless phones, Bluetooth, WiFi, car alarms, ZigBee, and wireless microphones. Due to the sheer number of such devices in use, there is a possibility of interference between signals in the 2.4 GHz band.

Interference can cause disruption to certain signals. But some signals are so important that a disruption to the signals is not desirable. For example, in an electric vehicle, a battery management system (BMS) might be configured to receive readings from each sensor at regular intervals, such as every 20 milliseconds. This can be termed an update cycle or a data collection cycle in some embodiments. Embodiments described herein will discuss various systems and methods that can be used to improve reliability and communication quality between wireless nodes.

Figure 2:
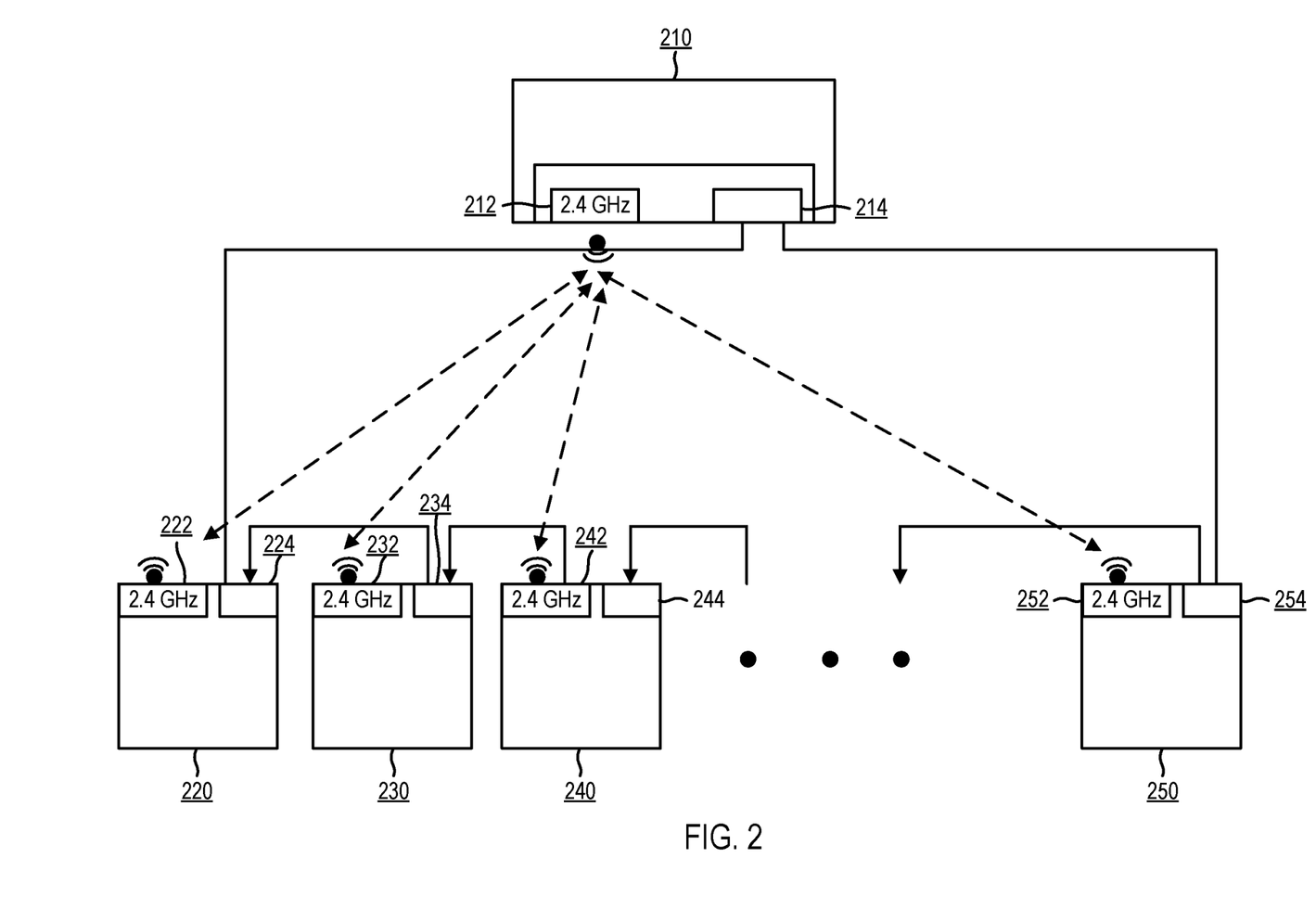
FIG. 2 shows a block diagram of a coupling between multiple sensor nodes and a master node.

One potential solution is illustrated with respect to FIG. 2, a block diagram illustrating a system that has a coupling between multiple sensor nodes and a master node 210. System 200 also includes sensor nodes 220, 230, 240, and 250. Additional potential nodes are indicated by the ellipses. Master node 210 includes two different types of transceivers, primary transceiver 212 and secondary transceiver 214. In a similar manner, sensor node 220 includes primary transceiver 222 and secondary transceiver 224; sensor node 230 includes primary transceiver 232 and secondary transceiver 234; sensor node 240 includes primary transceiver 242 and secondary transceiver 244; sensor node 250 includes primary transceiver 252 and secondary transceiver 254. It should be understood that, while only four sensor nodes are illustrated in FIG. 2, embodiments of the present disclosure can include a greater number or a lesser number of sensor nodes.

In some embodiments, primary transceiver 212 (of master node 210) is configured to communicate with primary transceivers 222, 232, 242, and 252. In some embodiments, this communication may be via 2.4 GHz wireless signals. This communication path can be considered the primary communication path between master node 212 and each of nodes 220, 230, 240, and 250.

Secondary transceiver 214 is configured to communicate with secondary transceivers 224, 234, 244, and 254. Various embodiments can have different manners of communicating with secondary transceivers 224, 234, 244, and 254. In some embodiments, power line communications (PLC) can be used as the secondary method of communicating. In some embodiments, described in further detail below, near field communications can be used as the secondary method of communicating. Other communications also can be used, such as any other optical, acoustic, or any other possible communication method, including, but not limited to, optical wireless communication (OWC) and light fidelity (LiFi). In some embodiments, transceivers 224, 234, 244, and 254 can be coupled together in one of a variety of different configurations. For example, a multi-drop configuration can be used in some embodiments. In some embodiments, a star configuration network topology can be used. In other words, instead of there being a direct connection between each of secondary transceivers 224, 234, 244, and 254 and secondary transceiver 214 of master node 210, transceiver 214 is only directly connected to two transceivers—secondary transceivers 224 and 254 in the configuration shown in FIG. 2. However, each of the secondary transceivers are electrically coupled to each of the other secondary transceivers. In such a manner, each secondary transceiver is capable of communicating directly with any other secondary transceiver in the network.

In some embodiments, in cases in which the primary transmission is received without any issue for a particular update cycle, the secondary transmission can be ignored. In such embodiments, the secondary transmission is only examined when there is an issue with the primary transmission. In some embodiments, the secondary transmissions can be analyzed at a random or pseudorandom interval, as a way to ensure that the primary transmission is working properly. In some embodiments, the secondary transmission is analyzed at every update cycle to compare with the primary transmission.

Figure 3:
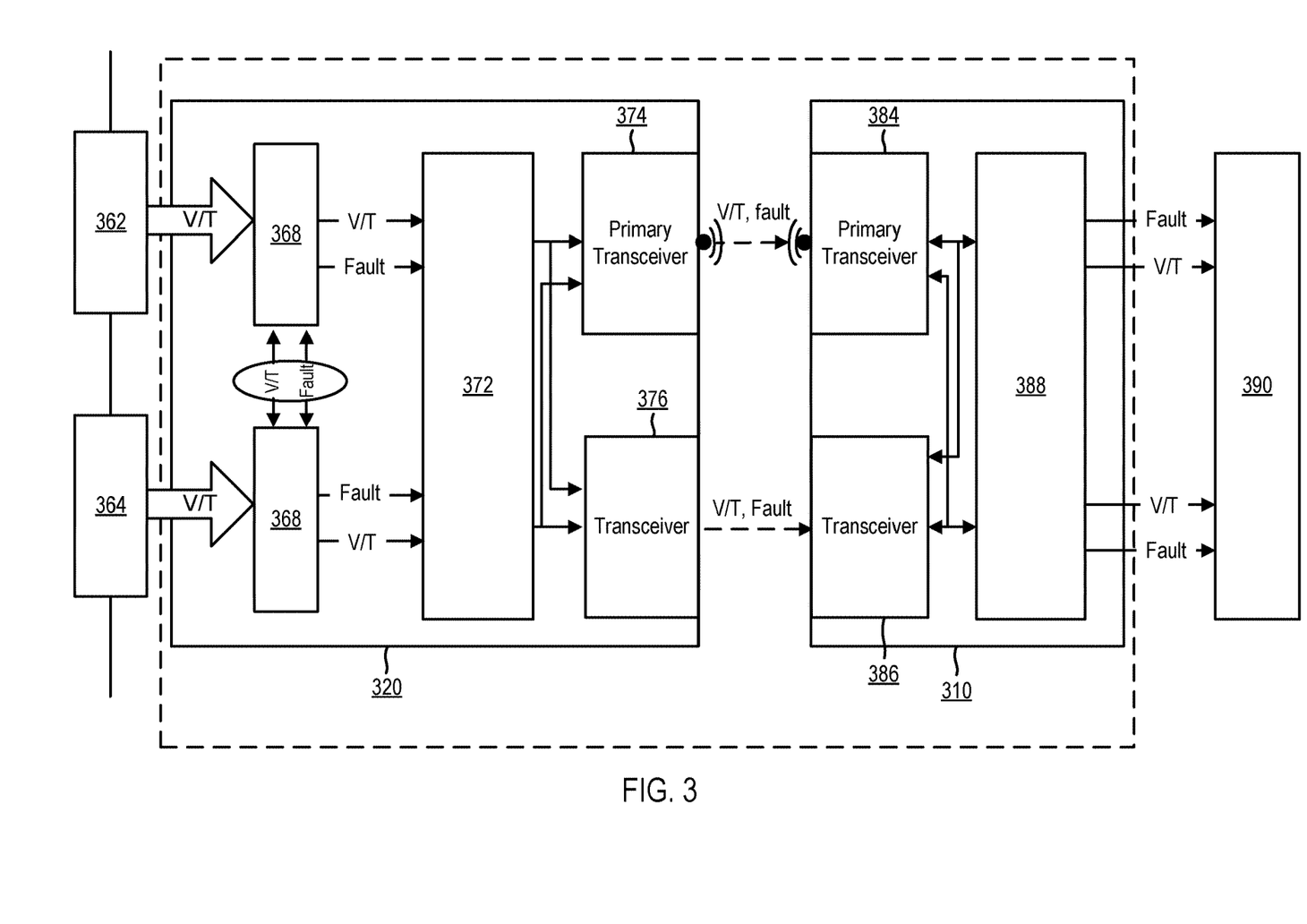
FIG. 3 shows a block diagram of the internal layout of a master node and a sensor node in one embodiment.

With reference to FIG. 3, a block diagram illustrating the internal layout of a master node 310 and a sensor node 320 is shown. It should be understood that master node 310 can be a master node 210 while sensor node 320 is an example of any one of sensor nodes 220, 230, 240, and 250.

In the example shown in FIG. 3, sensor node 320 is being used to monitor elements 362 and 364. In some embodiments, elements 362 and 364 may be batteries. In such an embodiment, battery voltage, temperature, the existence of faults, and other characteristics may be monitored at regular intervals (e.g., the update cycle or data collection cycle) to ensure that the batteries of the vehicle are in proper operating condition. In some embodiments, each of batteries 362 and 364 represents multiple battery cells. In some embodiments, batteries are monitored in groups of 6-cells, though any type of grouping may be used. Batteries 362 and 364 are monitored by sensors (not shown), which are coupled to an analog front end (AFE) 368. AFE 368 is configured to process the raw signals from the sensors. If six cells are being monitored, AFE 368 may contain 6 channels such that each channel can monitor one battery cell. While two AFEs 368 are illustrated in FIG. 3, in some embodiments, there can be one AFE or more than two AFEs. Readers of skill in the art will realize that embodiments of the present disclosure can be used to receive and process any type of signal and is not necessarily restricted to receiving data about batteries.

AFE 368 is coupled to microcontroller 372. Although one microcontroller is shown in the figure, it should be understood that there can be a different number of microcontrollers in various embodiments. In addition, although element 372 is referred to as a microcontroller, any type of device that is capable of performing processing tasks may be used instead, such as an application specific integrated circuit (ASIC), a system on a chip (SoC), a microprocessor, and the like. Microcontroller 372 may be configured to read measurements from AFE 368 and send diagnostics. Microcontroller 372 may also be configured to encode the data using one of a variety of encoding techniques now known or developed in the future. Because the data will be transmitted wirelessly, it can be desirable to encode the data to prevent the vehicle from accidentally reading data from an adjacent vehicle. By encoding the data, only authorized users (such as the master node) can decode the signals. Thus, even if a bad actor or an inadvertent recipient receives the data, the unintended recipient cannot decode the signals. In some embodiments, there can be an additional microcontroller 372. In some embodiments, the additional microcontroller is different from the first microcontroller, such as being from a different manufacturer or using a different architecture. Using such a different microcontoller can avoid some common failures.

Coupled to microcontroller 372 are a primary transceiver 374 and a secondary transceiver 376. As discussed above, in some embodiments, primary transceiver 374 transmits via wireless frequencies, such as 2.4 GHz. Secondary transceiver 376 can utilize any type of communication that is different from the primary medium. In some embodiments, secondary transceiver 376 can transmit via PLC. In other embodiments (described in further detail below), near field communication can be used as the secondary medium. In some embodiments, microcontroller 372, primary transceiver 374, and secondary transceiver 376 could be embodied as a single ASIC. In other embodiments, AFE 368 also can be included in the single ASIC.

Central controller 310 includes a primary transceiver 384 and a secondary transceiver 386. Primary transceiver 384 is configured to communicate with primary transceiver 374, while secondary transceiver 386 is configured to communicate with secondary transceiver 376. As discussed above, in some embodiments, primary transceiver 384 communicates wirelessly with primary transceiver 374, such as via a 2.4 GHz signal. Secondary transceiver 386 may be configured to communicate via PLC signals with secondary transceiver 376.

Both primary transceiver 384 and secondary transceiver 386 are coupled to a microcontroller 388. Although one microcontroller is shown in the figure, it should be understood that there can be a different number of microcontrollers in various embodiments. In addition, although element 388 is referred to as a microcontroller, any type of device that is capable of performing processing tasks may be used instead, such as an application specific integrated circuit (ASIC), a system on a chip (SoC), a microprocessor, and the like. Microcontroller 388 is configured to perform the processing used to read the data that was transmitted by sensor controller 320 and received by transceiver 384. For example, microcontroller 388 may be configured to decode the received data. Microcontroller 388 may be configured to check for faults such as data loss, repletion, insertion, incorrect sequence, corruption, delay, and the like. In some embodiments, microcontroller 388, primary transceiver 384, and secondary transceiver 386 could be embodied as a single ASIC. From microcontroller 388, signals can be transmitted to any device 390 that desires to read what was being sensed by sensor controller 320.

PLC transmits signals using power lines present in the vehicle. Those power lines can be utilized for data transmission in a PLC embodiment. In many vehicles, such power lines are direct current (DC), so the PLC being used is specific to DC. Using power lines to provide signals alleviates the need for additional signaling wire needed to be placed in the vehicle. Instead, the power lines, which will present in any case to power the sensor nodes, are used to transmit the information.

While the above embodiments discussed the use of PLC as the secondary transmission medium, in other embodiments, other secondary transmission mediums may be used. In one embodiment, the secondary transmission medium is near field communication. As is known in the art, NFC allows two electronic devices to communicate with each other when they are in close proximity to each other (on the order of 4 centimeters). While there are disadvantages to requiring such close proximity, there also are advantages, such as less interference from unintended signals, as only a component in close proximity can receive signals from a particular transmission.

In some embodiments utilizing near field communication, a loop antenna is created and loops to within 4 centimeters of the secondary transceiver of each sensor node and each master node. In other embodiments, the loop antenna is within 10 to 20 centimeters of the secondary transceiver. The close proximity of the loop antenna and the secondary transceivers enable near field communication to take place. In some embodiments, the loop antenna can be configured to traverse from the master node and travel to each of the sensor nodes in the system. With reference to FIG. 2, instead of there being a connection between each of the secondary transceivers 224, 234, 244, and 254, there would be a loop antenna that positioned in proximity to each of the secondary transceivers 224, 234, 244, and 254. Depending on the power and distance of the NFC radio to the loop antenna, the secondary transceivers may operate as a chained communication channel or as a master-slave architecture. In such a manner, the NFC communication is more easily used to transmit data.

In other embodiments, the secondary transmission medium is also wireless. For example, the secondary transceiver in each of the sensor nodes can be configured to transmit and receive signals at a different frequency. For example, lower frequencies, such as 433 MHz or 915 MHz can be used in some embodiments. In other embodiments, higher frequencies, such as 5 GHz, can be used to transmit the signals. Readers of skill in the art will realize that other embodiments may make use of other frequencies and that the frequencies listed above and below are intended to be non-limiting examples.

Figure 4:
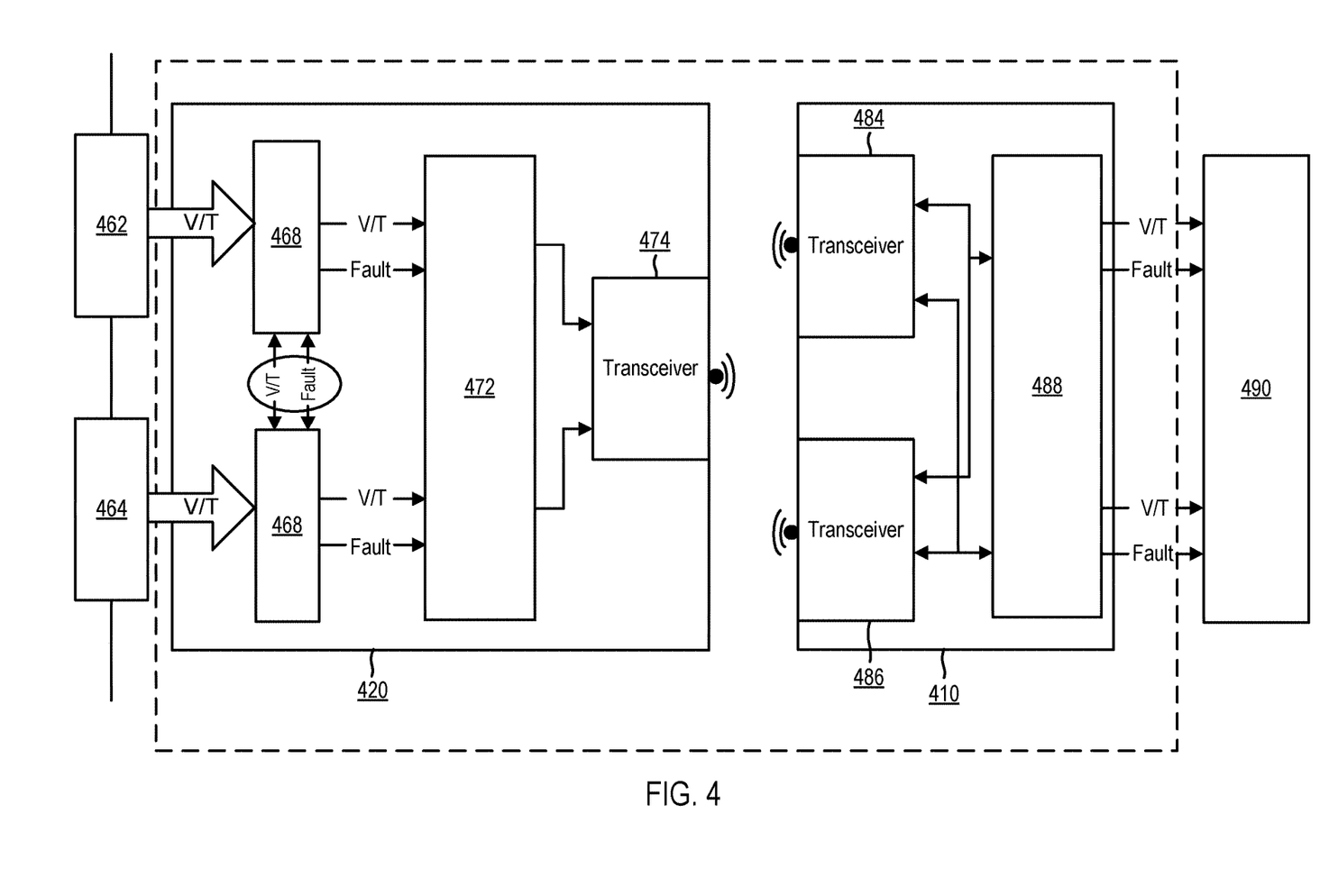
FIG. 4 shows a block diagram of the internal layout of a master node and a sensor node in another embodiment.

Another embodiment is illustrated with respect to FIG. 4. With reference to FIG. 4, a block diagram illustrating the internal layout of a master node 410 and a sensor node 420 is shown. It should be understood that master node 410 may be a master node 210 while sensor node 420 may be an example of any one of sensor nodes 220, 230, 240, and 250.

FIG. 4 is similar to FIG. 3 in that sensor node 420 is being used to monitor elements 462 and 464. In some embodiments, elements 462 and 464 may be batteries. In such an embodiment, battery voltage, temperature, the existence of faults, and other characteristics may be monitored to ensure that the batteries of the vehicle are in proper operating condition. In some embodiments, each of batteries 462 and 464 represents multiple battery cells. In some embodiments, batteries are monitored in groups of 6-cells, though any type of grouping may be used. Batteries 462 and 464 are monitored by sensors (not shown), which are coupled to an analog front end (AFE) 468. AFE 468 is configured to process the raw signals from the sensors. If six cells are being monitored, AFE 468 may contain 6 channels such that each channel can monitor one battery cell. While two AFEs 468 are illustrated in FIG. 4, in some embodiments, there can be one AFE or more than two AFEs. In the embodiment of FIG. 4, it should be understood that embodiments of the present disclosure can be used to receive and process any type of signal and is not necessarily restricted to receiving data about batteries.

AFE 468 is coupled to microcontroller 472. Although one microcontroller is shown in the figure, it should be understood that there can be a different number of microcontrollers in various embodiments. In addition, although element 372 is referred to as a microcontroller, any type of device that is capable of performing processing tasks may be used instead, such as an application specific integrated circuit (ASIC), a system on a chip (SoC), a microprocessor, and the like. Microcontroller 472 may be configured to read measurements from AFE 468 and send diagnostics. Microcontroller 472 may also be configured to encode the data. Because the data will be transmitted wirelessly, it can be desirable to encode the data to prevent the data from being read by a bad actor or to prevent the vehicle from accidentally reading data from an adjacent vehicle. By encoding the data, only authorized users (such as the master node) can decode the signals. Thus, even if a bad actor or an inadvertent recipient receives the data, the unintended recipient cannot decode the signals. In some embodiments, there can be an additional microcontroller 472. In some embodiments, the additional microcontroller is different from the first microcontroller, such as being from a different manufacturer or using a different architecture. Using such a different microcontoller can avoid some common failures. The additional units can provide redundancies to avoid common failure. In some embodiments, there can be an additional microcontroller 472.

A difference between FIG. 3 and FIG. 4 is that there is only a single transceiver 474 within sensor node 420. Instead of using two different communication media to provide redundancy, transceiver 474 transmits using two different subnets at a different frequency, but in a similar frequency band. For example, two different channels within the 2.4 GHz spectrum may be used. In some embodiments, microcontroller 472 and transceiver 474 could be embodied as a single ASIC. In other embodiments, AFE 468 also can be included in the single ASIC.

Central controller 410 includes a primary transceiver 484 and a secondary transceiver 486. Primary transceiver 484 is configured to communicate with transceiver 474, while secondary transceiver 486 is also configured to communicate with transceiver 474. As discussed above, in some embodiments, primary transceiver 484 communicates wirelessly with primary transceiver 474. Secondary transceiver 486 also may be configured to communicate via a wireless signal.

More specifically, in some embodiments, the system operates at two or more subnets at two frequencies or two frequency hopping schemes. In each update cycle, a sensor node transmits information through one subnet in the first half of the updating cycle and then sends the same information again through the second subnet in the second half of the updating cycle. Thus, redundant information is received by the master node in each cycle. Because the two subnets use different frequencies, it is less likely for both to be interfered by external sources simultaneously, leading to a more reliable wireless communication system.

Both primary transceiver 484 and secondary transceiver 486 are coupled to a microcontroller 488. Although one microcontroller is shown in the figure, it should be understood that there can be a different number of microcontrollers in various embodiments. In addition, although element 488 is referred to as a microcontroller, any type of device that is capable of performing processing tasks may be used instead, such as an application specific integrated circuit (ASIC), a system on a chip (SoC), a microprocessor, and the like. Microcontroller 488 is configured to perform the processing used to read the data that was transmitted by sensor controller 420 and received by transceiver 484. For example, microcontroller 488 may be configured to decode the received data. Microcontroller 488 may be configured to check for faults such as data loss, repletion, insertion, incorrect sequence, corruption, delay, and the like. From microcontroller 488, signals can be transmitted to any device 490 that desires to read what was being sensed by sensor controller 420. In some embodiments, microcontroller 488, primary transceiver 484, and secondary transceiver 486 could be embodied as a single ASIC.

Figure 5A:
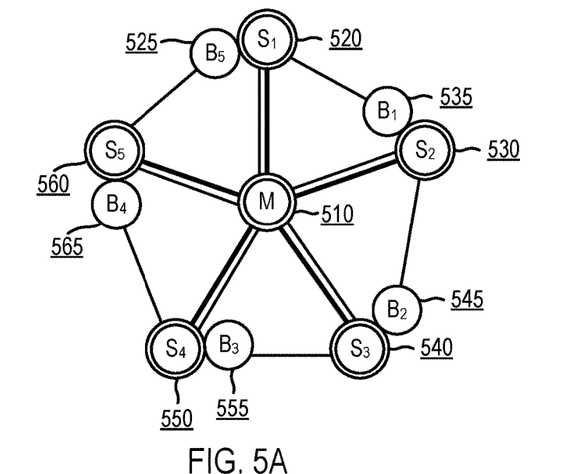
FIGS. 5A, 5B, and 5C illustrate an embodiment featuring the use of buddy nodes.

In some embodiments, alternative layouts can be implemented in an attempt to increase reliability of a wireless system. With reference to FIG. 5A, one or more embodiments of the present disclosure is illustrated. Like FIG. 1, network 500 comprises a master node 510 and sensor nodes 520, 530, 540, 550, and 560. However, each of the sensor nodes 520, 530, 540, 550, and 560 has a 'buddy' node 530, 540, 550, 560, and 520. For clearer explanation however, and in order to differentiate the buddy functionality from the main sensor node functionality, these buddy nodes are labelled 525, 535, 545, 555, and 565, respectively. The buddy node enhances communication protocols with the intent to provide significant over-the-air performance and bandwidth improvements with moderate adjustments to the system. The buddy node mechanism provides assistance to each sensor node in order to leverage its over-the-air coupling with master node 510.

In this configuration, the primary data path is directly from each of the sensor nodes 520, 530, 540, 550, and 560 to master node 510. However, there is a secondary data path from each sensor node to its buddy node and then to the master node.

The buddy node can be chosen in a variety of different manners. The pairing of nodes with their buddied nodes may be done by careful analysis of the relative strength of the RF link between each node and the master node. In some cases, due to preferred RF diversity, a sensor node will not be adjacent to its buddy node. However, for the purposes of illustration only, FIG. 5A depicts each sensor node adjacent to its buddy node. In other words, Sensor node 525 is the buddy node of sensor node 560. This is signified in FIG. 5A as sensor node 560 having the notation $S_5$, while sensor node 525 has the notation Bs. In a similar manner, sensor node 535 is the buddy node of sensor node 520, sensor node 545 is the buddy node of sensor node 530, sensor node 555 is the buddy node of sensor node 540, and sensor node 565 is the buddy node of sensor 550.

In some embodiments, the buddy node can be any other node in the system. In some embodiments, the buddy node can be changed at startup. In other words, sensor node 530 could serve as the buddy node to sensor node 520 during one use. But the next time the system is turned on, it is sensor node 540 that serves as its buddy node. In some embodiments, there could be a dedicated node that serves as a buddy node for each sensor node. Instead of being full featured sensor nodes, these dedicated buddy nodes might only contain the transceivers and only serve to receive transmissions from other nodes for forwarding to a central node. In addition, each sensor node also can have a different buddy node for different frequency channels.

The operation of the secondary data path is most easily explained through the use of an example. Assume that the buddy node for sensor 520 is sensor 530 (symbolized as buddy node 535 in FIG. 5A). For each update cycle or data collection cycle n (for example, once every 20 milliseconds), there is a transmission of data from sensor node 520 to master node 510. Although it is the same data, the transmission may be a buddy node of another sensor node. Therefore, the transmission from 520 to 510 may contain both its own sensing data and data from another node. In addition, the data from sensor node 520 to the master node 510 is read by its buddy node (sensor node 530, represented as buddy node 535 in this example). During the subsequent data collection cycle n+1, sensor node 530 sends the data it read during cycle n from its buddied node, sensor node 520, to master node, in addition to sending its own data from cycle n+1.

Figure 5B:
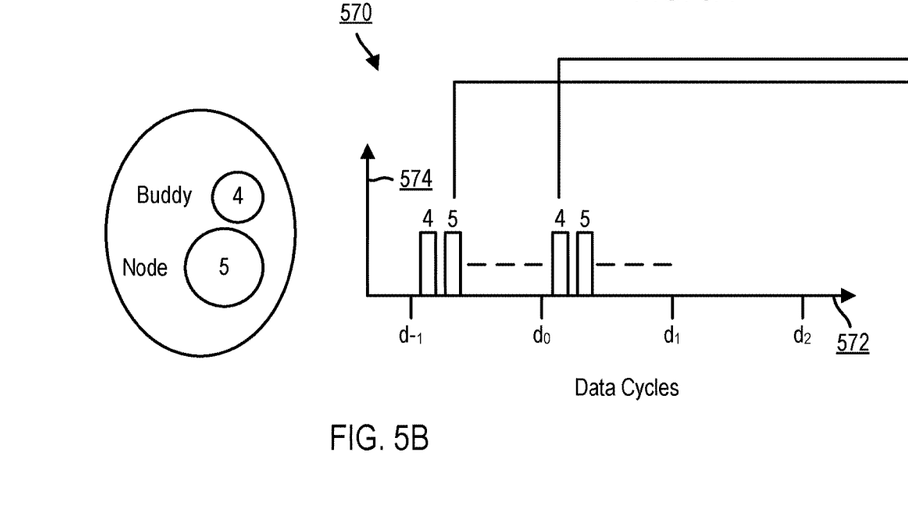

With reference to FIG. 5B, a timing diagram 570 illustrating this operation is illustrated. In timing diagram 570, x-axis 572 represents time moving forward to the right for each data collection cycle. Y-axis 574 represents the existence of data being transmitted. At data collection cycle $d_{-1}$ data from buddy node 530 and from node 520 are transmitted. At data collection cycle $d_0$ data from buddy node 530 and from node 520 are transmitted. However, at data collection cycle $d_0$, the data being transmitted by buddy node 530 includes data for node 530 in data collection cycle $d_0$ and data from node 520 from data collection cycle $d_{-i}$.

Figure 5C:
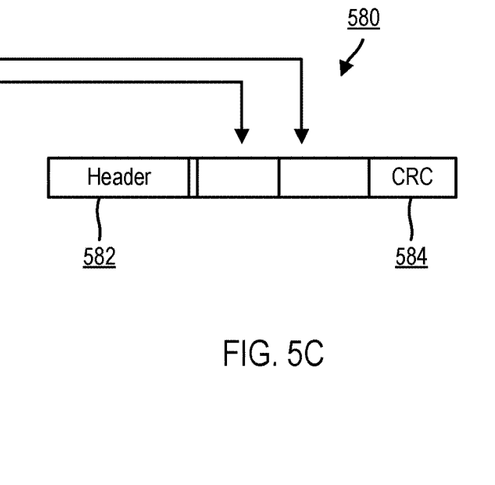

With reference to FIG. 5C, an example packet from node 530 is illustrated at data collection cycle $d_0$. Packet 580 includes a header 582 and a cyclic redundancy check (CRC) 584, used for detecting errors. While a CRC is illustrated in FIG. 5C, it should be understood that any type of error detection mechanism can be used. In between header 582 and CRC 584 is the payload. The payload comprises data from node 530 at data collection $d_0$. The payload also comprises data from node 520 from cycle $d_{-1}$.

The data retransmission provides time diversity. In other words, the same data is sent at two different points in time ($d_{-1}$ and $d_0$ in the above example). In addition, in cases in which frequency hopping is used (for example, the embodiment illustrated above in FIG. 4), frequency diversity may be present if each node transmits at a different frequency than its buddy node. In other words, the transmission from one node is sent at a first frequency and the subsequent transmission of the same data from the buddy node is sent at a second frequency. The frequency and time diversity may serve to reduce the packet error rate and provide more reliable readings from the sensors. In some embodiments, data from the buddy node can be ignored if data from the original sensor node was received.

Figure 6A:
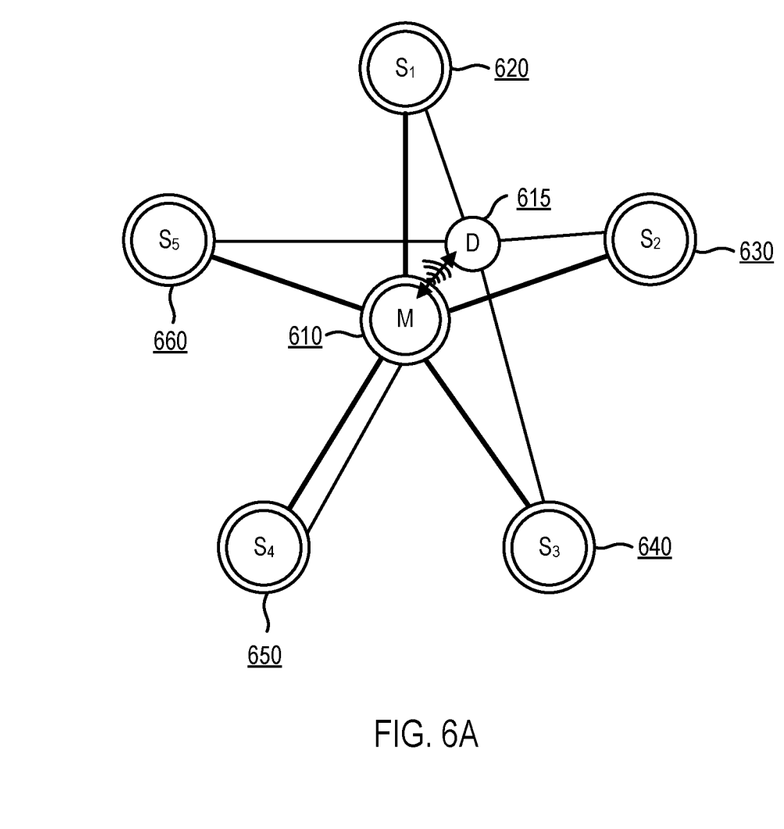
FIGS. 6A and 6B illustrate an embodiment featuring the use of deputy nodes.

An alternative embodiment is illustrated in FIG. 6A. These embodiments illustrate the use of a "deputy" node. Graph 600 is similar to graph 100 in that it includes a master node 610 and sensor nodes 620, 630, 640, 650, and 660. Also included is a deputy node 615. Deputy node 615 is a proposed enhancement to communication protocols with the intent to provide significant over-the-air performance and bandwidth improvements, with moderate adjustments to the system. The deputy mechanism provides assistance to master node 610 by relaying messages, removing and reducing RF signal faded areas, and providing RF visibility to the most remote nodes. Deputy node 615 may also act as an assistant to master node 610 by performing tasks such as data logging, processing, and performing network analysis in parallel with the normal runtime operation orchestrated and supervised by master node 610. There may or may not be a wired connection between master node 610 and deputy node 615. The primary purpose of deputy node 615 is to act as a relay for information. Deputy node 615 may be positioned at a vantage point from the RF perspective, to complement performance of master node 610.

Deputy node 615 can be coupled to master node 610 in one of a variety of different manners, both wired and wireless. If using a wireless coupling, deputy node 615 can either be placed on a separate subnet as master node 610. In one or more embodiments, the master node and the deputy node are on the same subnet. The effectiveness of a deputy node may depend on the relative physical location of both master node 610 and deputy node 615, as well as the relative RF path differences between each sensor node and master node 610 compared to that of each sensor node and deputy node 615.

Figure 6B:
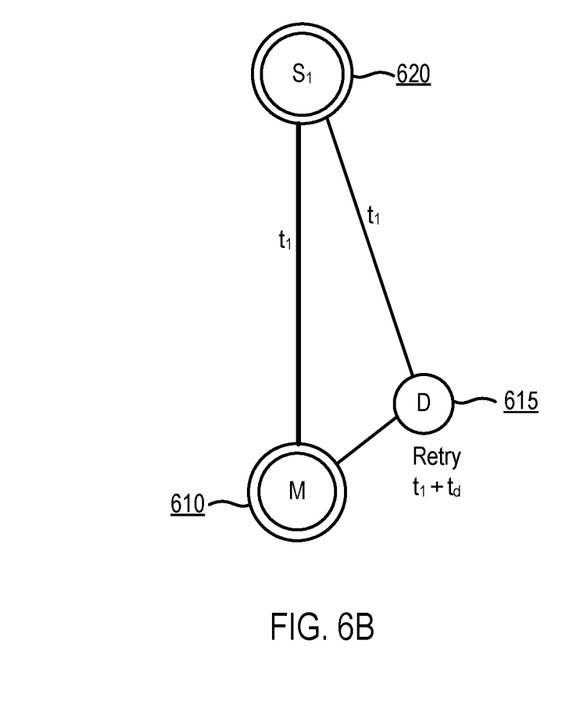

As illustrated in FIG. 6B, when sensor node 620 sends information to master node 610, sensor node 620 also sends information to deputy node 615. This occurs at a time $t_1$. At a subsequent time $t_1+t_d$, deputy node 615 sends information to master node 610. In some embodiments, this transmission may occur every time deputy node 615 receives information from sensor node 620. In some embodiments, this transmission may occur only when master node 610 did not receive a transmission from sensor node 620 for a particular period.

Figure 7:
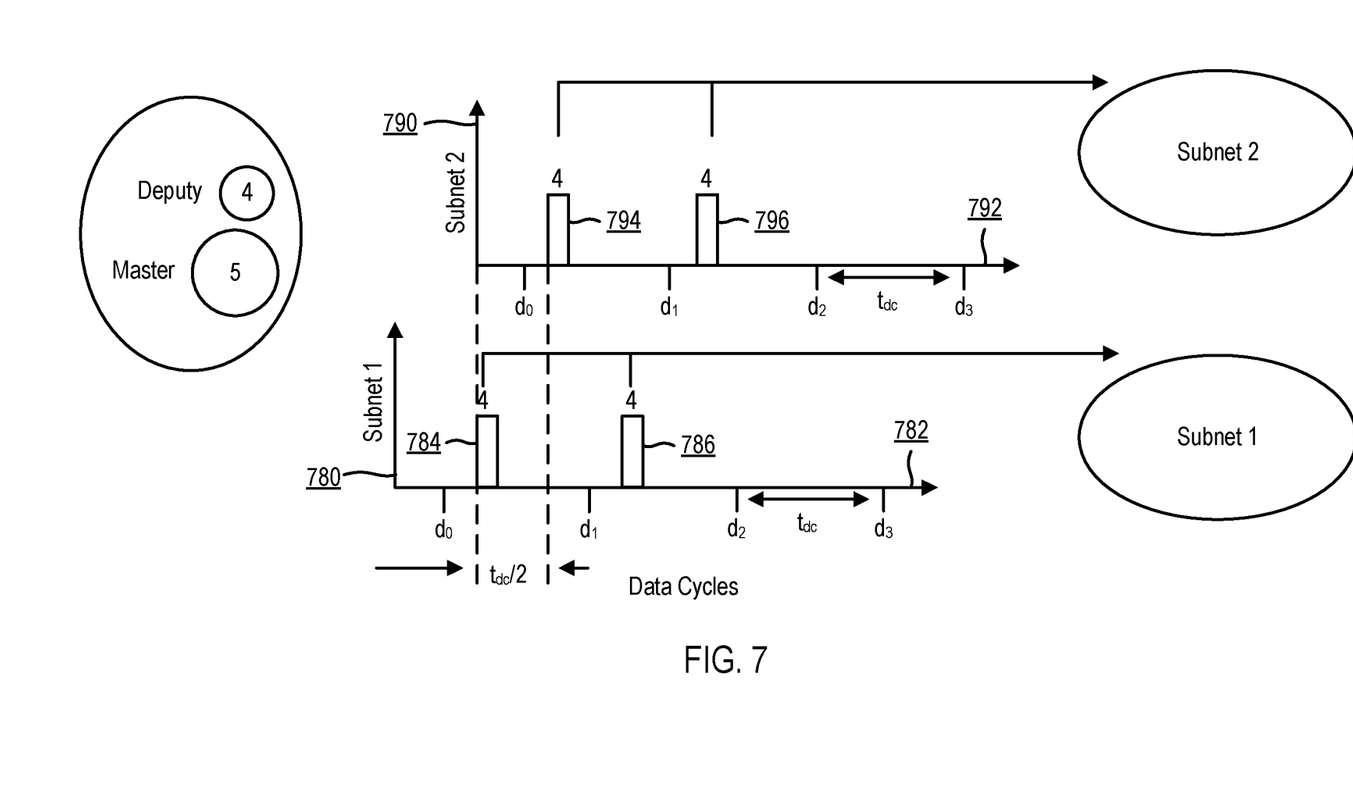
FIG. 7 illustrates a timing diagram featuring the use of deputy nodes.

With reference to FIG. 7, in some embodiments involving the use of one or more deputy nodes, each sensor node may be configured to transmit its data over two subnets, spaced out by $t_{dcs}/2$, where $t_{dcs}$ is the data collection cycle duration. The data cycle duration can be selected to be any appropriate value, such as between 10 and 30 milliseconds in some embodiments. In FIG. 7, graph 780 illustrates the operation of a sensor node transmitting via the first subnet while graph 790 illustrates the operation of a sensor node transmitting via the second subnet. X-axis 782 and 792 represents time. The master node thus receives the same transmitted data from two paths, one being from its own transceiver and one via the deputy node, and uses this duplicated data for improving data integrity and reliability.

At data collection cycle $d_0$, a sensor node sends its data packet over the first subnet to the master node, as indicated by bar 784. At a time offset by $t_{dcs}/2$, the sensor node sends the data packet over the second subnet to the deputy node, as indicated by bar 794. At the next data collection cycle $d_1$, the sensor node in question sends its data packet over the first subnet to the master node, as indicated by bar 786. At a time offset by $t_{dcs}/2$, the sensor node sends the data packet over the second subnet to the deputy node, as indicated by bar 796. It should be understood that, in some embodiments, the data could be sent to the deputy node prior to being sent to the master node.

Figure 8:
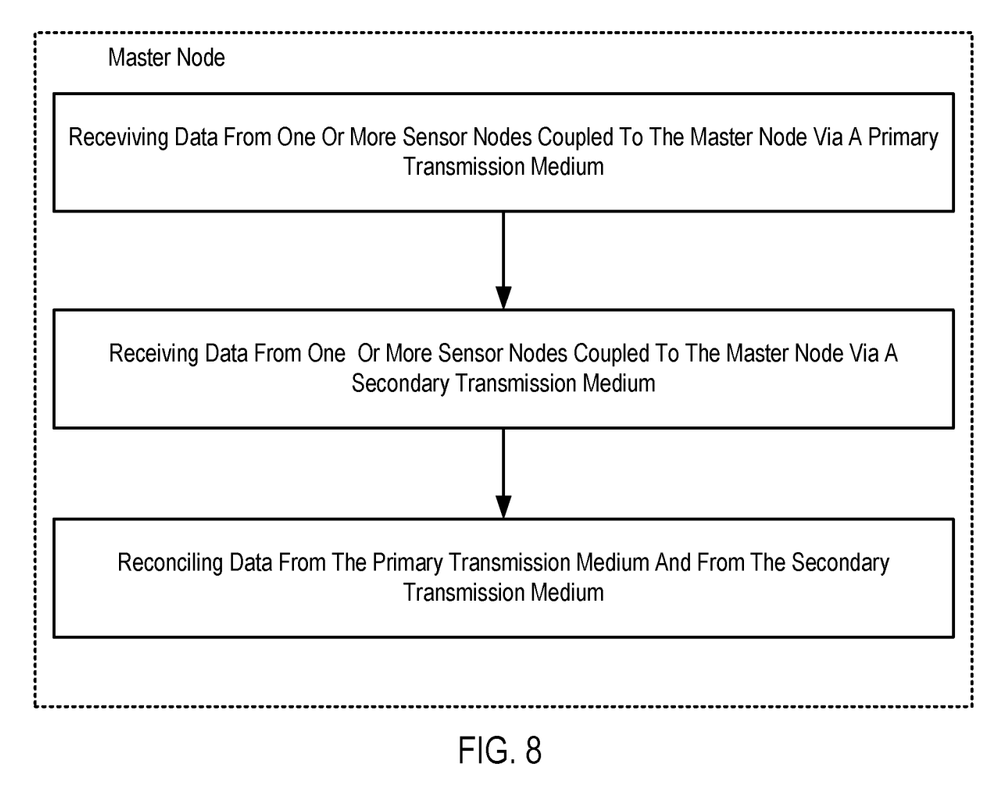
FIG. 8 is a flow chart of a particular illustrative embodiment of hybrid wireless communication.

With reference to FIG. 8, a flow chart of a particular illustrative embodiment of a method for hybrid wireless communication is presented. The method of FIG. 8 includes receiving data from primary medium 802, by a master node 801, first data from one or more sensor nodes coupled to the master node via a primary wireless transmission medium. The method of FIG. 8 also includes receiving data from secondary medium 804, by the master node 801, second data from one or more sensor nodes coupled to the master node via a secondary transmission medium, which is different from the primary wireless transmission medium. As discussed above, the secondary transmission medium may be chosen from one of a variety of different mediums. In some embodiments, the secondary transmission medium is powerline communications (PLC). In some embodiments, the secondary transmission medium is near field communication (NFC). Other secondary transmission mediums also may be used. The method of FIG. 8 also includes reconciling 806 the first data from the primary wireless transmission medium and the second data from the secondary transmission medium. Reconciling 806 the first data from the primary wireless transmission medium and the second data from the secondary transmission medium may be carried out by comparing the first data and the second data; and checking for faults such as data loss, repletion, insertion, incorrect sequence, corruption, delay, and the like. In one embodiment, if the first data from the sensor node is unreadable or otherwise not usable, the master node can use the second data from the deputy node instead.

Figure 9:
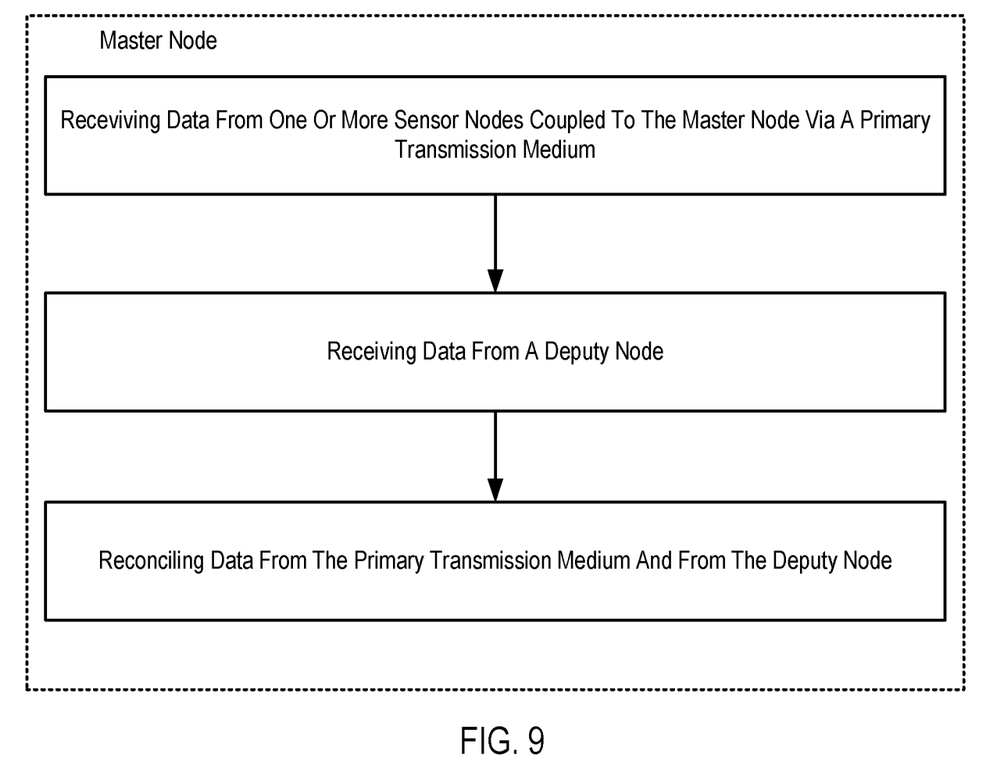
FIG. 9 is a flow chart of a particular illustrative embodiment of deputy scheme communication.

With reference to FIG. 9, a flow chart of a particular illustrative embodiment of a method hybrid wireless communication is presented. The method of FIG. 9 includes receiving 902, by a master node 901, data from one or more sensor nodes coupled to the master node via a primary transmission medium. As discussed above, the primary transmission medium may be a wireless transmission medium. The method of FIG. 9 also includes receiving 904, by the master node 901, data from a deputy node coupled to the one of the one or more sensor nodes. As discussed above, the deputy node also receives data from the one or more sensor nodes. Because each sensor node sends data to both the master node and to the deputy node, there is less chance of the data being unreadable. The method of FIG. 9 also includes reconciling 906, by the master node, the first data from the primary wireless transmission medium and the second data from the deputy node. Reconciling 906 the first data from the primary wireless transmission medium and the second data from the deputy node may be carried out by comparing the first data and the second data; and checking for faults such as data loss, repletion, insertion, incorrect sequence, corruption, delay, and the like. In one embodiment, if the first data from the sensor node is unreadable or otherwise not usable, the master node can use the second data from the deputy node instead.

The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. No words denoting orientation are used to describe an absolute orientation.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may be dependent from any or all claims in a multiple dependent manner even though such has not been originally claimed.

What is claimed is:

1. A method for hybrid communication between battery sensor nodes of a battery management system, the method comprising:
    receiving, by a master battery sensor node, first data from a particular battery sensor node of one or more battery sensor nodes via a primary transmission medium;
    receiving, by the master battery sensor node, second data from the particular battery sensor node of the one or more battery sensor nodes via a secondary transmission medium different from the primary transmission medium;
    reconciling, by the master battery sensor node, the first data from the primary transmission medium and the second data from the secondary transmission medium; and
    wherein the master battery sensor node is configured to receive data from the particular battery sensor node via the primary transmission medium and the secondary transmission medium during a same update cycle.

2. The method of claim 1, wherein the secondary transmission medium is powerline communications.

3. The method of claim 2, wherein each battery sensor node of the plurality of battery sensor nodes is coupled together in a star configuration network topology to the master battery sensor node for the secondary transmission medium.

4. The method of claim 1, wherein the secondary transmission medium is near-field communications.

5. The method of claim 1, further comprising:
    receiving data from the one or more battery sensors at a buddy battery sensor node, the buddy battery sensor node being another battery sensor node of the plurality of battery sensor nodes;
    transmitting data from the buddy battery sensor node to a master battery sensor node to ensure the proper transmission of data from the one or more battery sensors to a master battery sensor node.

6. The method of claim 1, wherein the secondary transmission medium is chosen from the group comprising a second wireless frequency, power line communication, and near-field communication.

7. A method for hybrid wireless communication between battery sensor nodes of a battery management system, the method comprising:
    receiving, by a master battery sensor node, first data from one of one or more battery sensor nodes via a primary wireless transmission medium;
    receiving, by the master battery sensor node via a secondary wireless transmission medium different from the primary wireless transmission medium, second data from a deputy battery sensor node coupled to the one of the one or more battery sensor nodes, wherein the second data is received during a same update cycle as receiving data via the primary wireless transmission medium; and
    reconciling, by the master battery sensor node, the first data from the primary wireless transmission medium and the second data from the deputy battery sensor node.

8. The method of claim 7, wherein the deputy battery sensor node is configured to receive data via a same subnet as the master battery sensor node.

9. The method of claim 7, wherein each battery sensor node is configured to transmit data to the master battery sensor node via a first subnet and to transmit data to the deputy battery sensor node via a second subnet.

10. The method of claim 7, wherein each battery sensor node of the plurality of battery sensor nodes is configured to transmit data to the master battery sensor node at a first time and to transmit data to the deputy battery sensor node at a second time, the first and second time being separate by a time less than a data collection cycle duration.

* * * * *